(12) United States Patent
Faye et al.

(10) Patent No.: US 6,542,461 B1
(45) Date of Patent: Apr. 1, 2003

(54) METHOD OF PROTECTING ATM CONNECTIONS IN A TELECOMMUNICATIONS NETWORK

(75) Inventors: Jean Claude Faye, Gif sur Yvette (FR); Paul Vinel, Velizy (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/313,358

(22) Filed: May 18, 1999

(30) Foreign Application Priority Data

May 19, 1998 (EP) .............................. 98401211

(51) Int. Cl.⁷ .............................................. H04L 12/56
(52) U.S. Cl. ...................... 370/225; 370/217; 709/239
(58) Field of Search ................................ 370/225, 228, 370/217, 218, 227, 229, 351, 352; 709/239; 340/827, 825.01; 379/221

(56) References Cited

U.S. PATENT DOCUMENTS

| | | | | |
|---|---|---|---|---|
| 5,398,236 A | * | 3/1995 | Hemmady | 370/218 |
| 5,471,460 A | * | 11/1995 | Tanabe | 370/218 |
| 6,359,857 B1 | * | 3/2002 | Ahmad et al. | 370/217 |

OTHER PUBLICATIONS

Saito, H. et al.: "An Improved Guided Restoration Algorithm for ATM Crossconnect Networks" 1996 IEEE Network Operations and Management Symposium (NOMS), Kyoto, Apr. 15–19, 1996, vol. 1, No. Symp. 5, Apr. 15, 1996, pp. 225–234, XP000641094, Institute of Electrical and Electronics Engineers.

Jones, C. K. et al.: "A Fast ATM Rerouting Algorithm for Networks with Unreliable Links" Serving Humanity Through Communications. Supercomm/ICC, New Orleans, May 1–5, 1994, vol. 1, May 1, 1994, pp. 91–95, XP000438889, Institute of Electrical and Electronics Engineers.

Akihiko Takase et al.: "ATM Transport Node for Flexible and Robust Access Networks" Proceedings of the Global Telecommunications Conference (Globecom), Houston, Nov. 29–Dec. 2, 1993, pp. 1481–1487, XP000431317, Institute of Electrical and Electronics Engineers.

Hideo Tatsuno et al.: "Hitless Path Protection Switching Techniques for ATM Networks" Electronics and communications in Japan, Part I—Communications, vol. 77, No. 8, Aug. 1, 1994, pp. 13–23, XP000485780.

* cited by examiner

*Primary Examiner*—Kenneth Vanderpuye
(74) *Attorney, Agent, or Firm*—Sughrue Mion, PLLC

(57) ABSTRACT

A method of protecting ATM connections in a telecommunications network including at least one protection domain which covers only a portion of a connection, each protection domain comprising a source node and a peer sink node. Each source node and its peer sink node can be interconnected by at least two alternative connection segments and can switch over from one connection segment to the other. Any node of the network can send an alarm message downstream over a current path and each node can store a connection fault status when it receives such an alarm message. Each sink node which receives the alarm message sends a switchover request message to its peer source node to request a switchover which is executed only if the peer source node has not itself stored an alarm message. The sink node switches over only if the peer source node has responded positively.

2 Claims, 2 Drawing Sheets

METHOD OF PROTECTING ATM CONNECTIONS IN A TELECOMMUNICATIONS NETWORK

The invention relates to the protection of ATM connections in a network which includes at least one protection domain which covers only a portion of a connection. Each protection domain comprises a first access node and a second access node. Each of these access nodes can switch over from a first connection to a second connection in the event of the first connection failing. For the direction of transmission going from the first access node to the second access node, the first access node is called the "source" node, and the second access node is called the "sink" node.

BACKGROUND OF THE INVENTION

Until now, the existing protection method has been applicable only when the protection domain covers a complete connection from end to end. It is based on the Alarm Indicator Signal (AIS) function: AIS cells are sent downstream to inform downstream nodes about a transmission fault. It uses an "Automatic Protection Switching" (APS) protocol. When a sink node receives an AIS cell; it sends a switchover request message to the source node by means of an APS cell. Then the source node and the sink node both switch over.

When a protection domain covers only a portion of a connection, that method is not applicable because the sink node cannot tell whether the AIS cell originates from a node located before or after the source node.

OBJECT AND SUMMARY OF THE INVENTION

The aim of the invention is to propose a method which is applicable when the network includes at least one protection domain covering only a portion of a connection, without changing anything in the present definition of the AIS function, for simplicity and for backward compatibility with the present state of the art. In the invention, protecting the ATM connection is a separate problem from Operation And Maintenance (OAM), and therefore it can be solved separately. Since APS cells have been created specifically for this problem, the proposed method is based on using such APS cells, and AIS cells are used for triggering the APS mechanism.

The invention provides a method of protecting ATM connections in a telecommunications network including at least one protection domain which covers only a portion of a connection, each protection domain comprising a source node and a peer sink node, each source node and its peer sink node being capable of being interconnected by at least two alternative connection segments and being capable of switching over from one connection segment to the other; any node of the network being capable of detecting a connection fault upstream and of sending an alarm message downstream via the current path, and each node being capable of storing a fault connection status when it receives such an alarm message; the method comprising the following steps:

in each sink node which receives the alarm message, sending a switchover request message to its peer source node to request a switchover, which request is executed only if the peer source node has not itself stored an alarm message;

and then, in said sink node, switching over only if the peer source node has responded positively.

Preferably, the invention further consists in sending a confirmation message from a sink node to a peer source node in order to confirm that the sink node is switching over, and in switching over in the source node only if the source node receives the confirmation message.

BRIEF DESCRIPTION OF THE DRAWINGS

An implementation of the invention is described by way of example with reference to the accompanying drawings, in which.

MORE DETAILED DESCRIPTION

Figure 1:
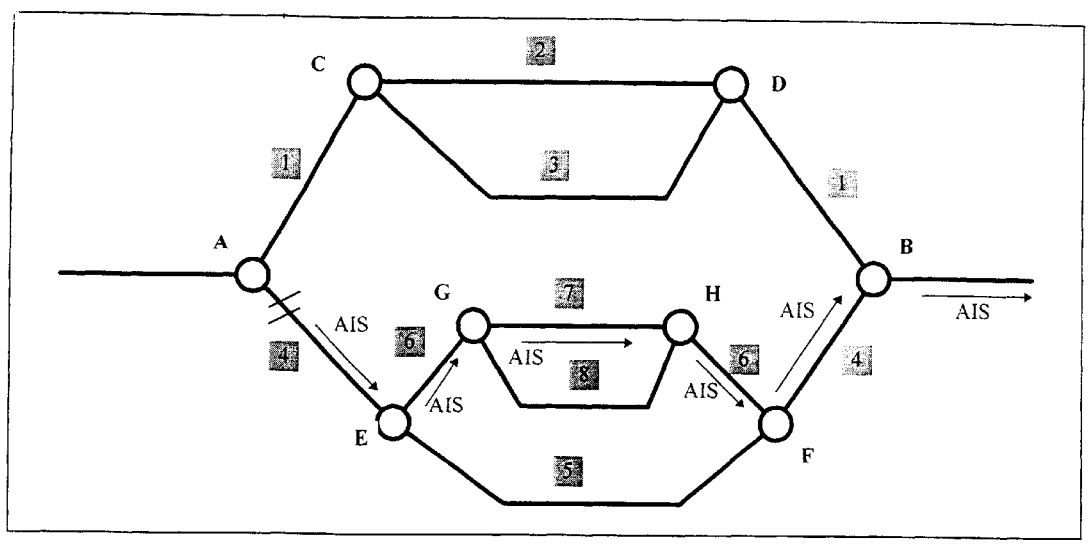
FIG. 1 shows an example of an ATM telecommunications network with nested protection domains.

In the example of FIG. 1, a connection is established between nodes A and B. Nodes A to H are capable of performing switchover between elementary connection portions numbered 1 to 8. There are protection domains which cover portions only of the connection, and which are nested within other protection domains:

Nodes C and D may be interconnected either by connection 2 or by connection 3;

Nodes G and H may be interconnected either by connection 7 or by connection 8;

Nodes E and F may be interconnected either by connection 6 (via G and H) or by connection 5;

Nodes A and B may be interconnected either by connection 1 (via C and D) or by connection 4 (via E and F).

For instance, assume there is a fault on connection segment 4 between A and E. Then, AIS cells are generated periodically either directly by E or by the first node on connection segment 4 (not shown on the figure). These AIS cells are received by all the nodes E, G, H, F and B, assuming that the active path is currently A-4-E-6-G-7-H-6-F-4-B. All these nodes record that the corresponding incoming connection is in the AIS state, by storing a connection fault status flag. All these nodes retransmit the AIS cells downstream.

The nodes H, F and B are the sink nodes of protection domains. Each of these sink nodes sends an APS message upstream to its peer source node respectively G, E and A, each sink node knowing the identity of its peer source node. Each APS message contains:

SWRQ: request for switchover,

G, #E or #A: address of the destination node.

The nodes G, E and A answer either by accepting or by refusing this switchover request:

acceptance if the status of the connection entering this node indicates no fault, as applies to node A.

refusal if the status of the connection entering this node indicates a fault, as applies to nodes G and E.

The source node may switch over as soon as it answers positively. Optionally, the source node may wait for a confirmation message, CF, sent from the sink node to the source node to indicate that the sink node is switching over and to trigger switchover of the source node, thereby improving reliability of the method.

Figure 2:
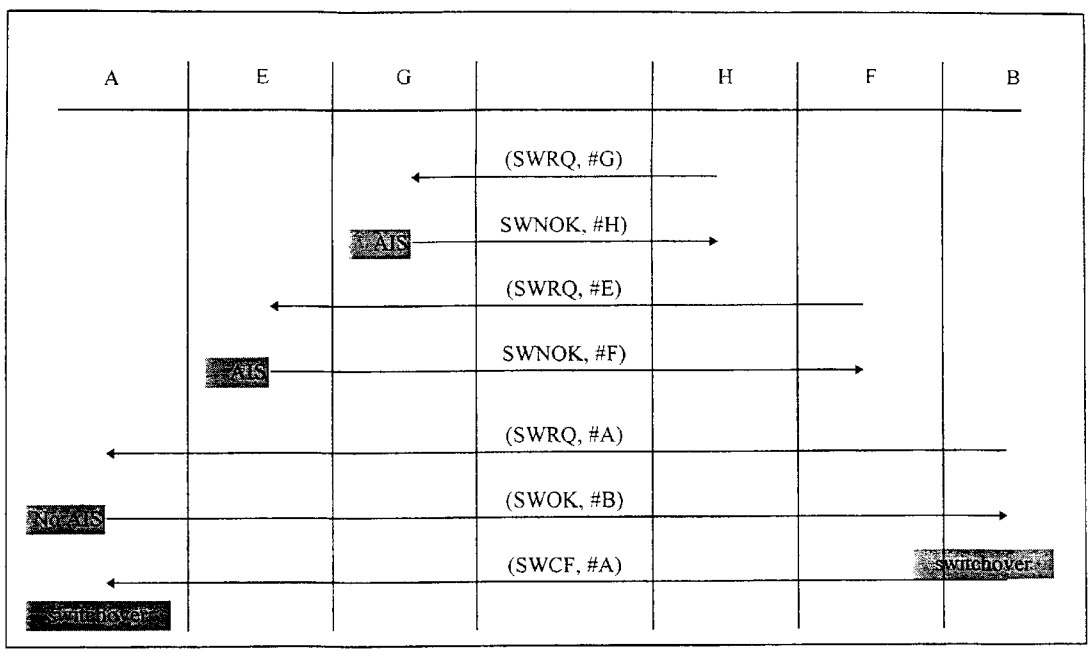
FIG. 2 illustrates the claimed method by showing the messages transmitted in this example of an ATM network when a transmission fault occurs.

FIG. 2 illustrates the claimed method by showing the APS messages transmitted in this example network when a transmission fault occurs. Node H sends a switchover request message (SWRQ, #G) to peer node G. Node G answers negatively (SWNOK, #H) and does not switch over, because it is in the AIS state. This means that the fault has occurred upstream therefrom. Then node F sends a switchover request message (SWRQ, #E) to peer node E. Node E answers negatively (SWNOK, #F) and does not switch over, because it is in the AIS state. This means that the fault has occurred upstream therefrom. Then node B sends a switchover request message (SWRQ, #A) to node A. This node A answers positively (SWOK, #B), because it is not in the AIS state. Node B then switches over and sends a confirmation message (SWCF, #A) to node A. Node A then switches over.

It may be observed that each sink node operates independently. They may operate quasi simultaneously. Only nodes A and B perform a switchover.

The APS protocol must use the standby ATM route in order to verify it before performing a switchover.

This solution has the following advantages:

- it separates the problems of OAM and network protection, and especially it needs no correlation between the concept of connection segment used for OAM purposes, and the concept of protection domains used for protection purposes, and therefore it does not need the notion of embedded connection segments;
- whatever the solution chosen for the AIS cells, and regardless of whether their definition is modified, it is still necessary to add a procedure based on APS cells in order to synchronize switchover, so, basing the network protection on APS cells brings no additional complexity; and
- this solution is backward compatible, since it needs no changes to present AIS cells and intermediate nodes.

What is claimed is:

1. A method of protecting ATM connections in a telecommunications network including at least one protection domain which covers only a portion of a connection, each protection domain comprising a source node and a peer sink node, each source node and its peer sink node being capable of being interconnected by at least two alternative connection segments and being capable of switching over from one connection segment to the other; any node of the network being capable of detecting a connection fault upstream and of sending an alarm message downstream via a current path, and each node being capable of storing a connection fault status when it receives such an alarm message;

the method comprising the following steps:
in each sink node which receives the alarm message, sending a switchover request message to its peer source node to request a switchover, which request is executed only if the peer source node has not itself stored an alarm message;
and then, in said sink node, switching over only if the peer source node has responded positively.

2. A method according to claim 1, further consisting in sending a confirmation message from a sink node to a peer source node in order to confirm that the sink node is switching over, and in switching over in the source node only if the source node receives the confirmation message.

* * * * *